United States Patent [19]

Healy

[11] 4,229,762
[45] Oct. 21, 1980

[54] OPTICAL VIEWING PORT ASSEMBLY FOR A MINIATURE INSPECTION TV CAMERA

[75] Inventor: Lawrence G. Healy, Horseheads, N.Y.

[73] Assignee: Westinghouse Electric Corp., Pittsburgh, Pa.

[21] Appl. No.: 4,514

[22] Filed: Jan. 18, 1979

[51] Int. Cl.³ .............................................. H04N 7/18
[52] U.S. Cl. ...................................... 358/100; 354/64; 358/225
[58] Field of Search ......................... 358/99, 100, 225; 354/64, 126

[56] References Cited

U.S. PATENT DOCUMENTS

| | | | |
|---|---|---|---|
| 2,060,670 | 11/1936 | Hartman | 358/99 |
| 2,849,530 | 8/1958 | Fleet | 358/100 |
| 2,912,495 | 11/1959 | Moon et al. | 358/100 |
| 3,114,299 | 12/1963 | Waters et al. | 358/100 |
| 3,757,042 | 9/1973 | Funk | 358/99 |

FOREIGN PATENT DOCUMENTS 1131506 6/1962 Fed. Rep. of Germany ............ 354/64
948003 1/1964 United Kingdom ..................... 358/100

OTHER PUBLICATIONS

Miniature Underwater TV Camera for Nuclear Reactor Inspection-Westinghouse Elec. Corp. Tech. Data 86-553T-Apr. 1977, pp. 1-4.

*Primary Examiner*—John C. Martin
*Assistant Examiner*—Joseph A. Orsino, Jr.
*Attorney, Agent, or Firm*—W. G. Sutcliff

[57] ABSTRACT

An optical viewing port assembly for a miniature TV camera, which hermetically seals the camera housing. The optical viewing port assembly includes a camera field of view reducing optical plug and high power light sources symmetrically disposed about this optical plug outside the camera field of view.

6 Claims, 5 Drawing Figures

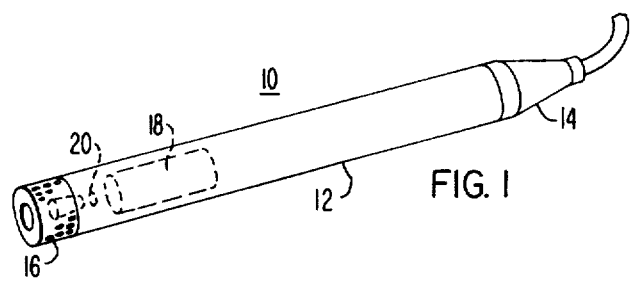
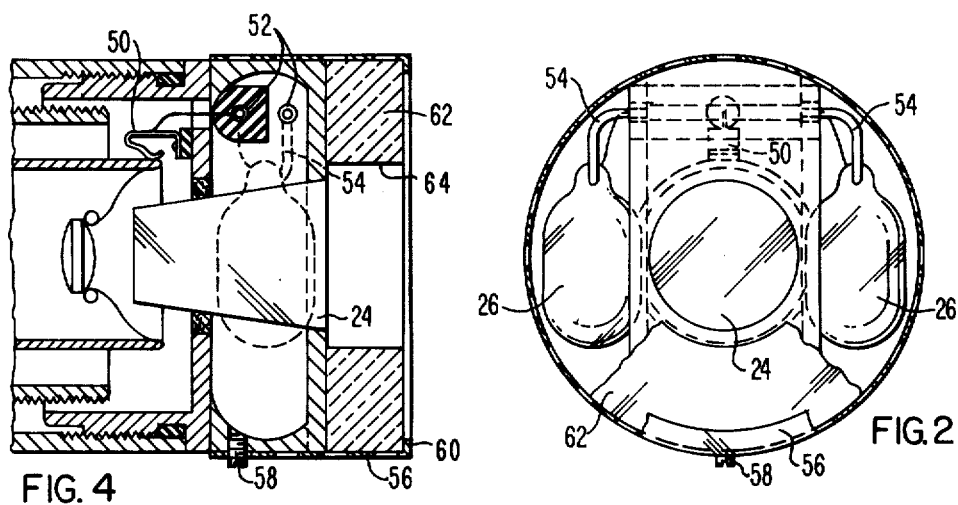
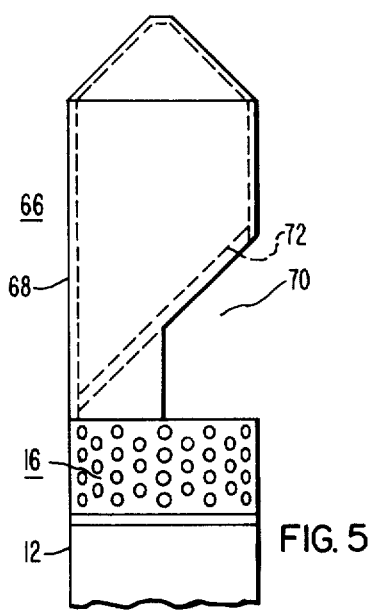
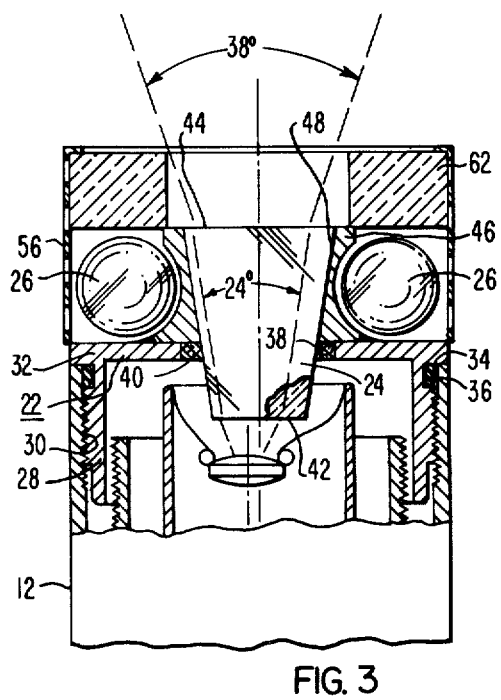

OPTICAL VIEWING PORT ASSEMBLY FOR A MINIATURE INSPECTION TV CAMERA

BACKGROUND OF THE INVENTION

The present invention relates to miniature TV camera inspection devices, and more particularly to an optical viewing port assembly which is hermetically sealable to a camera housing.

This particular assembly was designed for use with a miniature TV camera system which is useful for making underwater nuclear reactor vessel internals inspections. While the assembly was designed for this specific use, it can be used in many inspection or maintenance situations in dark, inaccessible areas that require visual inspection, such as for nuclear steam generators, steam turbines or general piping inspections.

A miniature camera with an overall housing diameter of only 1.25 inch diameter permits visual inspection in very limited areas which may only be accessible through inlet or outlet piping. The quality of the visual display which can be provided for the inspector is of course a function of the line resolution capability of the TV camera and of the quality of the lens or optical system through which the camera views the scene. The quality of the display also depends upon provision of adequate light within the inaccessible viewing environment. The structure which is being viewed or examined may have a low contrast surface or there may be particulate matter suspended in the medium between the camera and the viewed structure. The camera may have to view the structure from several feet away because of obstructions. It is therefore desirable that as high a lighting level as possible be provided. This high lighting level must be produced while maintaining the outside diameter of the camera housing as small as possible to ensure maximum maneuverability and utility for the camera.

A prior art attempts to provide a high lighting level was to position several miniature lamps about the optical axis of the camera. These lamps were of very small diameter and were rated at about one watt per lamp. While these lamps did not block the field of view of the camera, they provided very little light.

High wattage lamps have been attached to the outside of the camera head to provide high lighting levels, but these lamps add to the overall diameter of the camera and thereby limits its use in restricted space.

The prior art also includes the use of a high power lamp mounted axially ahead of the camera on an extended fixture. This lamp is in the camera field of view and typically blocks the center of the picture which is the highest quality image area for the camera.

SUMMARY OF THE INVENTION

An optical viewing port assembly has been designed which includes an integral high power light source which does not block the camera field of view. The assembly maintains the camera diameter, and includes a high refractive index, light transmissive optical plug supported along the camera optical axis. This optical plug has a radial dimension and a thickness such that when the assembly and plug are closely spaced from the camera lens, the camera field of view is reduced within the plug without reducing the usable image area for the camera. The field of view is reduced for a distance along the optical axis sufficient to permit a relatively high power miniature light source to be mounted about the optical plug without blocking the camera field of view. The optical plug does not reduce the usage image transmitted by the camera.

BRIEF DESCRIPTION OF THE DRAWINGS

FIG. 1 is a side elevation view of the miniature TV camera housing with the optical viewing port assembly of the present invention.

FIG. 2 is an elevational view, partly in section, of one embodiment of the optical viewing port assembly.

FIG. 3 is an elevation view from the side of the embodiment of FIG. 2.

FIG. 4 is a plan view looking into the assembly of FIGS. 2 and 3 along the optical axis.

FIG. 5 is an additional embodiment in which a right angle viewing adaptor is provided on the end of the embodiment of FIGS. 2, 3 and 4.

DESCRIPTION OF THE PREFERRED EMBODIMENTS

The invention can be best understood by reference to the embodiments seen in FIGS. 1 through 5. In FIG. 1, a miniature TV camera assembly 10 comprises tubular camera housing 12, with hermetically sealed cable connector 14 at one end, and an optical viewing port 16 at the other end of the housing. The camera housing 12 has a diameter of only 1.25 inch to permit ready access for the camera assembly. A miniature TV camera 18 is illustrated in phantom within the housing 12, as is a camera focus lens 20 which is closely spaced from the end of the housing 12 which is connectable to the optical viewing port 16. The camera housing also contains low noise field effect transistor video preamplifier and a remote focus motor which are not shown. The standard focus lens 20 is a radiation resistant lens of fixed aperture, 16 mm. f/2.8, which provides a field of view of 38 degrees in air and 28 degrees in water. In this embodiment the lens is shown as being mounted in an off-axis position, but the lens may be aligned with the camera axis.

The optical viewing port 16 is shown in greater detail in FIGS. 2, 3 and 4. The optical viewing port 16 is seen hermetically connected as an extension of the camera housing 12 and has the same diameter 1.25 inch. The optical viewing port 16 comprises a support member 22, a high refractive index, light transmissive optical plug 24 which is hermetically sealed to the support member 22, and a pair of relatively high power light sources 26. The light sources 26 are symmetrically mounted from the support member 22 about the optical plug 24.

The support member 22 includes a tubular body portion 28 having an external threaded portion 30 which screws into the camera housing. The tubular body portion 28 is open ended at the end which fits within the camera housing, and has an annular flange portion 32 at the other end. An O-ring groove 34 is provided on the exterior of the tubular portion 28 where it joins the flange portion 32, and an O-ring 36 fits within the groove 34. When the optical viewing port 16 is screwed into the camera housing 12, a hermetic seal is formed as the O-ring 36 is compressed by the housing 12 in the O-ring groove 34.

The flanged portion 32 has a central aperture 38 therethrough which is aligned along the camera axis. The high refractive index, light transmissive optical plug 24 extends through aperture 38, and is sealed therein by suitable hermetic sealing potting material 40.

The optical plug 24 is preferably formed of quartz, and in this embodiment is a truncated conic plug 24. This quartz plug 24 has an index of refraction which is about 1.5 and is greater than the index of refraction of the air medium between the small diameter end 42 of the conic plug 24 and the closely spaced camera lens 20, and also greater than the index of refraction of the medium into which the camera assembly is placed, such as water or air. The small diameter end 42 of the conic plug 24, the large diameter end 44 and the height or thickness of the conic plug are determined so that the camera field of view is reduced or restricted within the plug for a distance along the optical axis sufficient to permit the high power miniature light sources 26 to be mounted and spaced radially about the plug so that the light sources are not within the camera field of view. In the specific embodiment shown, the conic quartz plug 24 has a height or thickness of about 0.625 inch, a diameter of about 0.26 inch at the small diameter end 42 of the cone, and a diameter of about 0.437 inch at the large diameter end 44. The included angle of this conic plug is 17 degrees, which is designed to permit the plug to withstand the hydraulic pressure of the typical water medium operating environment. The plug 24 should in any case have a diameter, at the surface which is closely spaced from the lens, which encompasses the entire field of view. The plug 24 need not be conic and may be cylindrical or other shape. The plug 24 maintains a reduced or narrow field of view for a distance of the plug thickness sufficient to permit the light sources to be outside the field of view. For the embodiment described, the field of view with the quartz plug is about 24 degrees, which is reduced from the 38 degrees in air normally had from the camera and lens. The field of view is expanded back to 38 degrees in going from the large diameter end of the plug 24 to an air medium, or field of view of 28 degrees in water medium.

The support member 22 also includes a projecting mesa-like portion 46 which extends from the flange portion 32. This projecting elongated mesa-like portion 46 includes a central aperture 48 within which the conic plug 24 is sealed. The portion 46 thus extends between the conic optical plug 24 and the symmetrically disposed light sources 26. An electrical connection means 50 is insulatingly sealed through the flange portion 32 and the projecting portion to permit electrical connection to the light sources 26. The light sources 26 are supported from connector means 52 which are provided at one side of the projecting portion 46 for mounting and electrical connection, with the light source leads 54 fitting within the connector means 52. One of the connector means 52 is electrically isolated from the metal support member, and is electrically connected to electrical connection means 50. The support member 22 is metal and serves as the return electrical path to complete the electrical circuit for the light sources 26. The electrical connection means 50 makes contact with an electrical lead from the camera housing for powering the light sources.

The light sources 26 are preferably small diameter, tungsten-halogen lamps which are typically 0.374 inch in diameter and only 1.18 inch long for 35 watt lamps. The full wattage of 70 combined watts is only useable in a cooling water medium without risk of overheating. The lamps may be of different dimensions and wattage rating so long as they are small enough to fit within the assembly diameter. The lamp power can also be varied to vary the light output.

An apertured tubular protective shield 56 is provided about the lamps to permit cooling medium to contact and cool the lamps and to prevent damage to the lamp envelope. A shield retaining screw 58 fits in the side wall of the projecting portion 46 and screw 58 fits in an aperture of the shield 56 to retain it in place. An inwardly extending end flange 60 is provided at the extending end of the apertured shield 56 to retain a light transmissive, impact resistant annular end shield 62. The end shield 62 is preferably formed of polycarbonate material such as "Lexan", a General Electric Co. trademarked material. The aperture 64 through the annular end shield 62 exceeds the diameter of the large diameter end 44 of the conic optical plug 24 so as not to restrict the camera field of view. The end shield 62 permits light to pass but protects the lamps from damage or breakage or prevents any broken lamp envelope from falling within the inspection area. A wire mesh annular shield of high transmissivity may be substituted for this purpose.

The assembly described above is intended for straight ahead viewing from a very small focal distance to a large viewing distance with high illumination provided over the field of view.

In the embodiment shown in FIG. 5, a right angle viewing adaptor 66 is provided as an extension from the apertured shield 56. The right angle viewing adaptor 66 comprises a tubular extension 68, which has an open walled portion 70. An angled mirror 72 is supported within the tubular extension 68 facing typically at a 45 degree angle the open walled portion 70 and the optical viewing port 16. The mirror 72 is aligned with the camera axis for right angle viewing with light reflected about the camera optical axis to illuminate the field of view. The mirror angle can be varied for a fixed mount mirror, or a variable angle scanning mirror may be utilized.

I claim:

1. An optical viewing port assembly for a miniature cylindrical television camera housing having a viewing axis, which assembly comprises:
   (a) a support member including a tubular body portion one end of which is hermetically sealable to the cylindrical camera housing as an extension thereof, an inwardly extending flange portion at the other end of the tubular body portion with a central aperture through the flange portion aligned along the viewing axis, and an annular portion extending from the flange portion in the direction away from the tubular body portion and about the viewing axis;
   (b) a high refractive index light transmissive optical plug passing through the central aperture through the flange portion and through the annular portion, which optical plug is supported from and hermetically sealed to the flange portion of the support member along the camera optical axis, which plug has a radial dimension and a thickness, such that when the assembly is connected to the camera housing which includes a camera focus lens and the plug is closely spaced from the lens, the camera field of view is reduced along the plug without reducing the usable camera image area, which plug extends for a distance along the optical axis sufficient to permit a relatively high power miniature light source to be mounted and spaced radially about the plug so that the light source is not within the camera field of view; and (c) at least one relatively high power miniature light source mounted from the support member and disposed about the support member annular portion and the optical plug, with electrical connection means hermetically and insulatingly sealed through the flange portion of the support member to provide electrical connection to one terminal of the light source, and wherein the support member is conductive and is connected to the other terminal of the light source as the electrical return.

2. The optical viewing port assembly set forth in claim 1, wherein the optical plug comprises a conic quartz plug, with the small diameter end face toward the end of the tubular housing which is connectable to the cylindrical camera housing.

3. The optical viewing port assembly set forth in claim 1, wherein an apertured tubular protective shield is disposed about the light source and supported from the outer perimeter of the flange portion of the support member, said apertured tubular protective shield being of a diameter approximately equal to that of the tubular body portion, said apertured tubular protective shield having an inwardly extending end flange at the shield end extending away from the tubular body portion, and wherein a light transmissive, impact resistant apertured annular end shield is held in place over the light source by the end flange, with the aperture through the annular end shield having a diameter greater than the optical plug dimension so as not to restrict the camera field of view.

4. The optical viewing port assembly set forth in claim 3, wherein the assembly includes a right angle viewing adaptor comprising a generally tubular extension from the apertured protective shield, which tubular extension is open walled on one side and an angled mirror is supported within this tubular extension with the mirror aligned along the camera optical axis and at a predetermined angle with respect to the optical axis and the open walled side of the tubular extension so that light will be reflected about the camera optical axis and will illuminate the camera field of view.

5. The optical viewing port assembly set forth in claim 1, wherein the light source comprises a pair of small diameter miniature tungsten-halogen incandescent lamps.

6. The optical viewing port assembly set forth in claim 5, wherein for operation in an aqueous medium which serves as a coolant for the light source through the apertured tubular protective shield, the tungsten-halogen incandescent lamps may each have a wattage of up to 35 watts.

* * * * *